June 24, 1930.  B. HESTAND  1,767,979
COTTON HARVESTER
Filed June 1, 1927  4 Sheets-Sheet 1
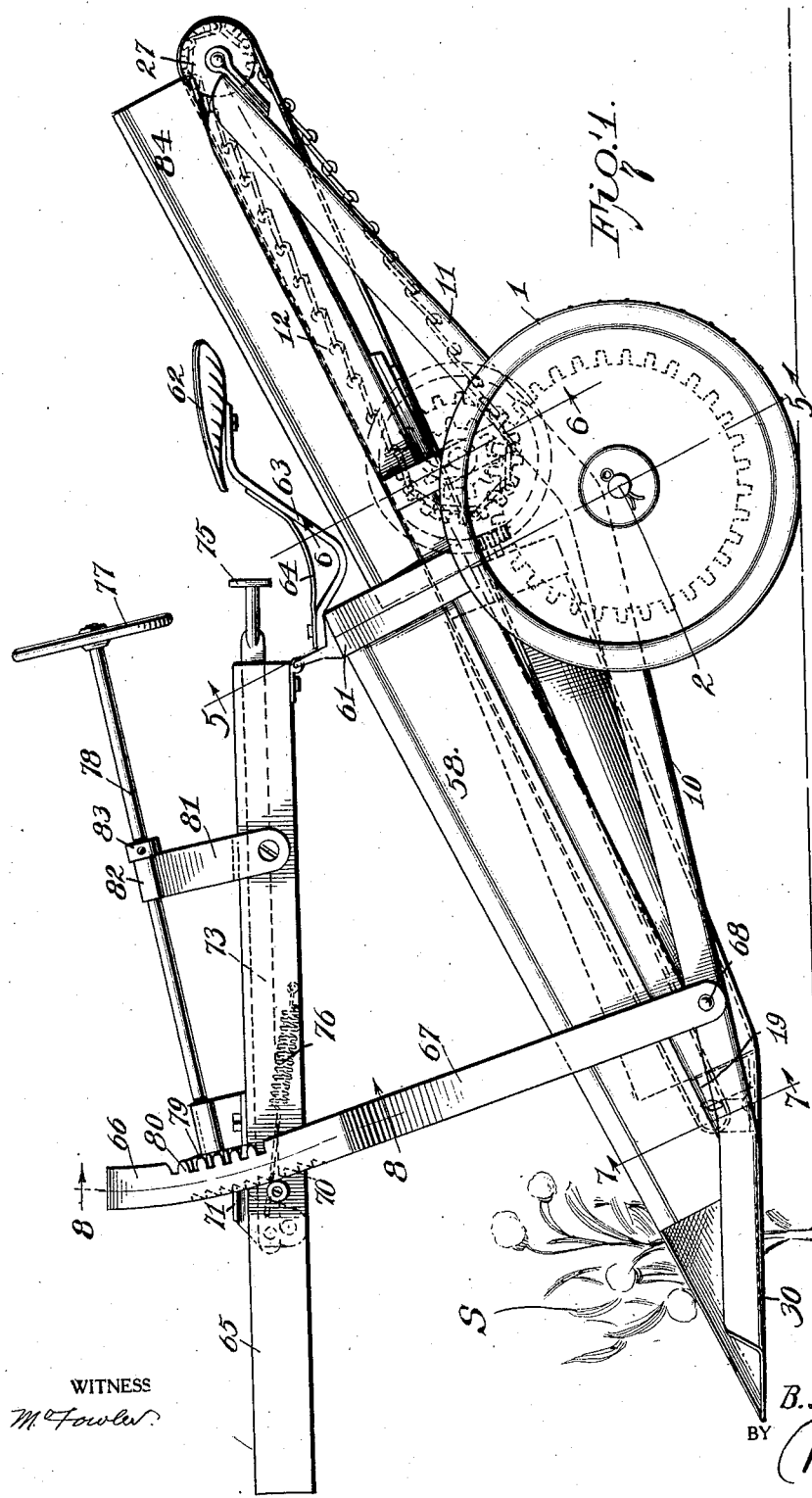
WITNESS
M. Fowler
INVENTOR
B. Hestand
BY
ATTORNEYS

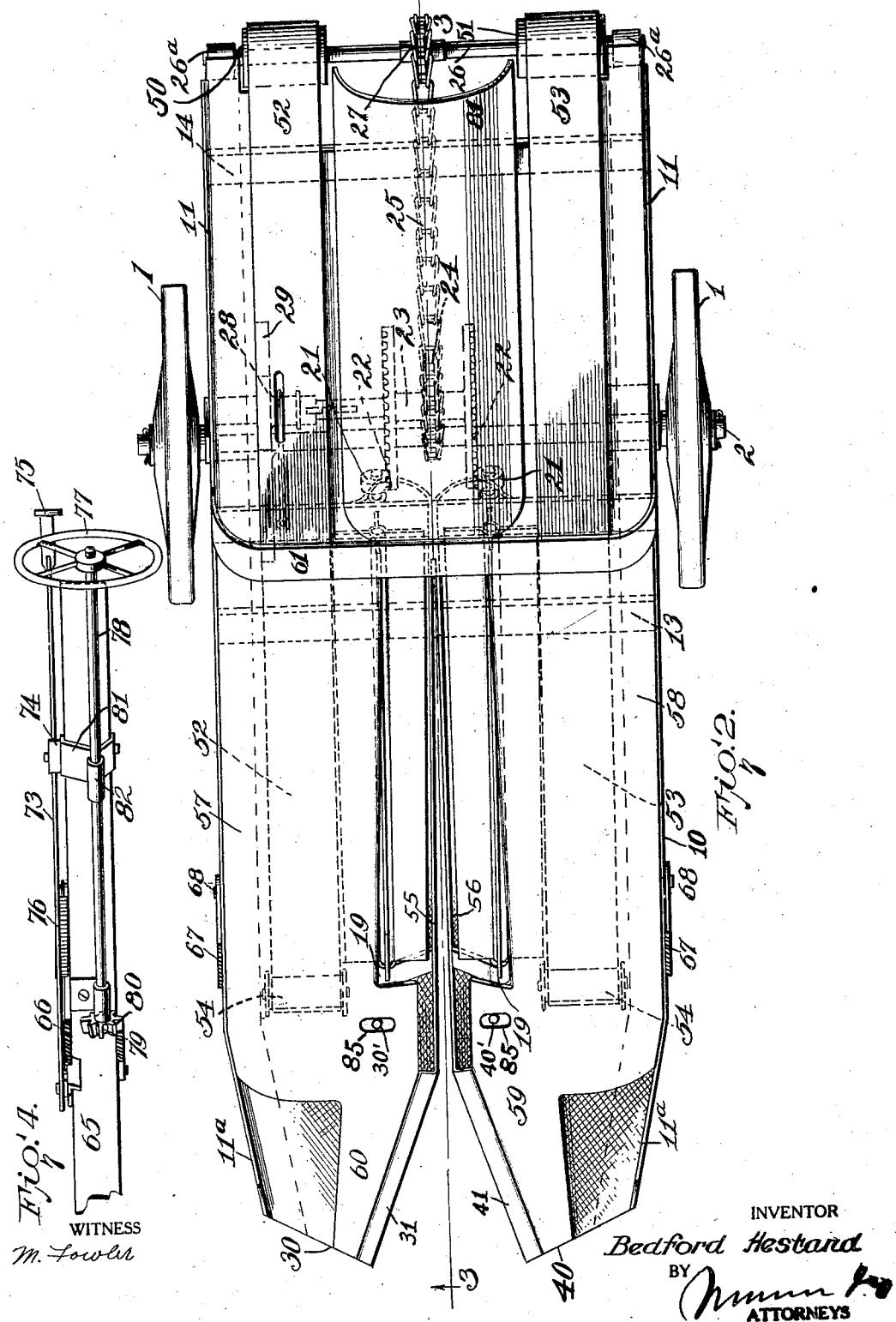

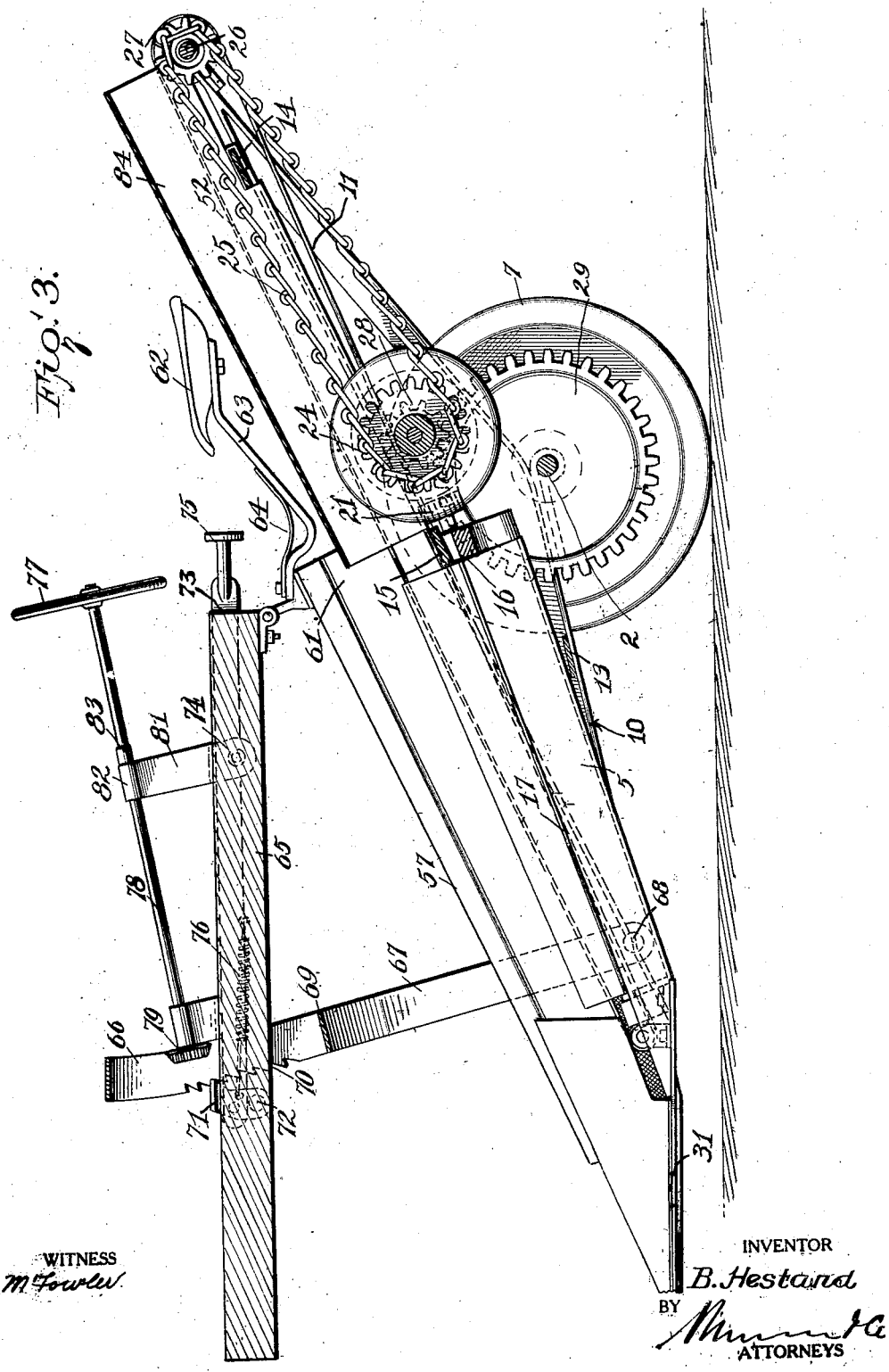

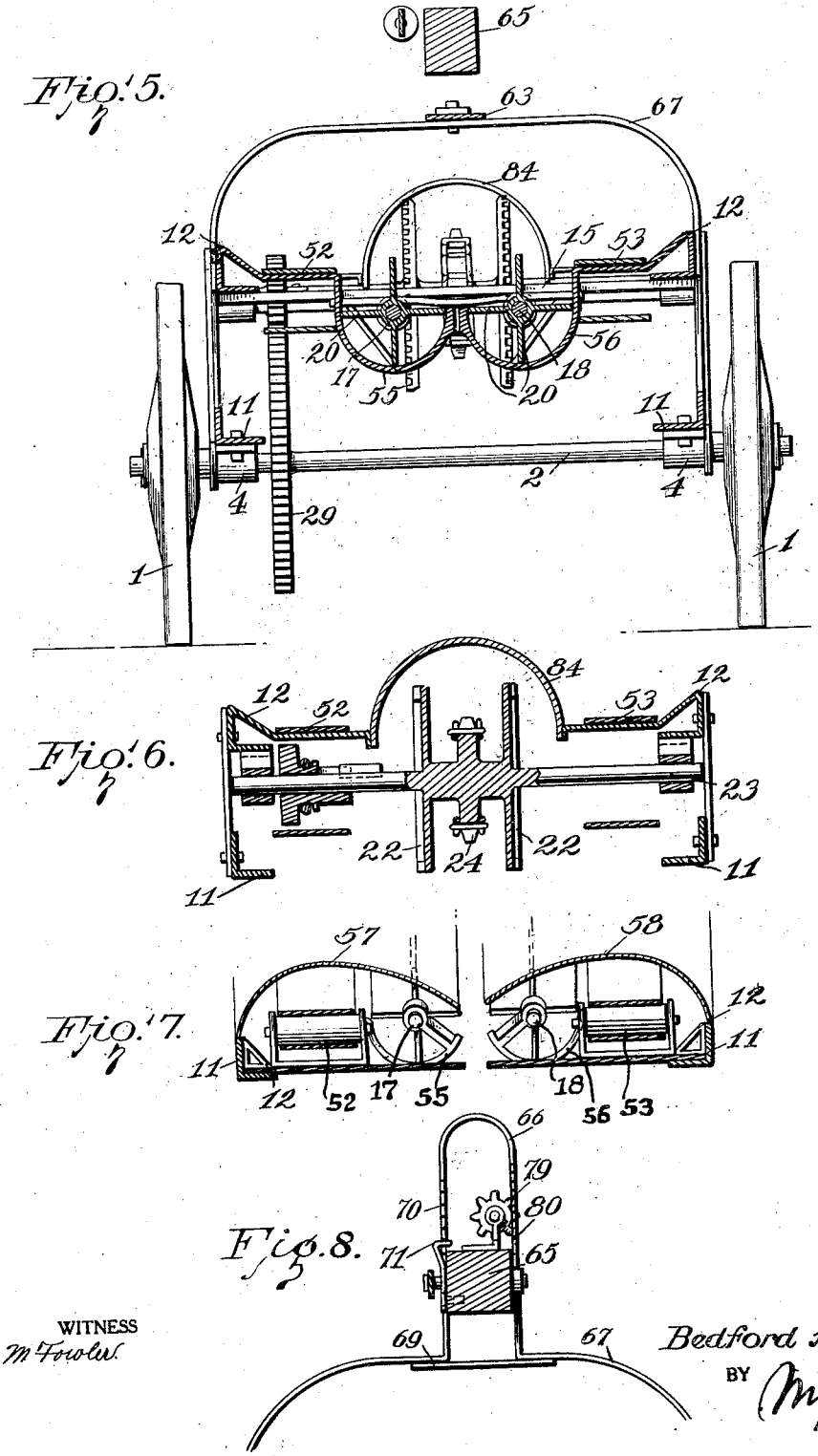

Patented June 24, 1930

1,767,979

UNITED STATES PATENT OFFICE

BEDFORD HESTAND, OF VERDEN, OKLAHOMA, ASSIGNOR OF ONE-HALF TO BERT LACKEY, OF CHICKASHA, OKLAHOMA

COTTON HARVESTER

Application filed June 1, 1927. Serial No. 195,733.

This invention relates to improvements in cotton harvesters and has for a primary object to provide a machine of this character provided with an improved arrangement whereby the bolls and open cotton may be stripped from the stalks and the cotton which is left, together with the loose cotton is driven off and carried up by strong currents of air furnished by rotating elements of the machine.

Another object is the provision of improved means for adjustably supporting the picker members according to the elevation of the row of plants to be operated upon.

In carrying out these objects, the invention is susceptible of a wide range of modification without departing from the spirit or sacrificing any of the advantages of the claimed invention; there being shown in the drawings for illustrative purposes a preferred and practical form, in which:

Figure 1 represents a side elevation of a cotton harvester constructed in accordance with this invention, Fig. 2 is a top plan view thereof with parts omitted, Fig. 3 is a longitudinal section taken on the line 3—3 of Fig. 2, Fig. 4 is a detail plan view partly in section of the controlling means for the picker, Fig. 5 is a transverse vertical section taken on the line 5—5 of Fig. 1, Fig. 6 is a similar view taken on the line 6—6 of Fig. 1, Fig. 7 is a vertical section taken on the line 7—7 of Fig. 1, and Fig. 8 is a detail sectional view taken on the line 8—8 of Fig. 1.

The mechanism of this invention desirably includes two traction wheels 1, 1 which are the only traction wheels in the organization. These traction wheels are free to rotate upon the axle 2 of the machine, in so far as such rotation will be permitted by means of the well known clutch devices, not shown, which are provided, as is well understood, for the purpose of permitting differential motion between the traction wheels, as in rounding corners or permitting the wheels freely to rotate upon the shaft or axle in backing, the clutching devices effecting a fixed relation between the wheels and the axle when the machine is being pulled forwardly in a straight line. It is deemed unnecessary to furnish a detailed description or illustration of these clutching devices, as their function, construction and purpose is well understood by those skilled in the art.

The frame which supports the axle 2 and the other parts of the mechanism, is preferably constructed of angle steel of suitable size and is shown inclined upwardly in opposite directions toward the front and rear respectively, from the bearings which support the axle 2, (see Fig. 1). These bearings, shown at 4, depend from the apices of the frame members 11 as is shown clearly in Fig. 5. These substantially V-shaped side members 11 of the frame 10 have the ends of each member connected by longitudinally extending bars 12, (see Fig. 1) which bars, as shown in Fig. 5 are substantially triangular in cross section.

A cross bar 13 connects and braces the side members 11 at a point in advance of the axle 2 and a similar bar 14 connects the members 12 near the rear end of the machine, as is shown clearly in Figs. 2 and 3.

Another cross bar 15 connects the longitudinal bars 12 at a point slightly in advance of the axle 2 and this bar 15 supports bearings 16 in which are journaled the rear ends of two longitudinally extending shafts 17 and 18, the front ends of which are journaled in bearings 19 located near the front end of the machine and supported by steel finger plates 30 and 40 presently to be described.

These shafts 17 and 18 have fixed thereto a plurality of longitudinally extending vanes or blades 20, any desired number of which may be employed, four being shown arranged on each shaft or rod. These blade carrying shafts extend longitudinally of the machine from a point adjacent the axle to a point at the rear of the finger plates 30 and 40 which are located at opposite sides of the front of the machine and supported by up-turned ends 11ª at the frame members 11.

Fixed to the rear ends of the shafts 17 and 18 are two cog wheels 21 which are designed to mesh with crown gears 22 carried by a transverse shaft 23 journaled in suitable bearings on the frame. A sprocket wheel 24 is also fixed to the shaft 23 and by means of a sprocket chain 25 imparts rotation to a counter-shaft 26 journaled in suitable bearings at the ends of the frame members 11 as is shown clearly in Fig. 2. This shaft 26 carries a sprocket gear 27 around which the sprocket chain 25 is trained.

A small gear wheel 28 is fixed to one end of the shaft 23 and meshes with a large gear 29 fixed to the axle 2.

Rollers or pulleys 50 and 51 are carried by the counter-shaft 26 at the ends thereof and have arranged thereover the conveyor belts 52 and 53 which are arranged longitudinally of the machine and pass around similar rollers 54 supported at the rear ends of the plates 30 and 40, as is shown clearly in Fig. 2.

These conveyors 52 and 53 are designed to receive the cotton which is gathered by the fingers 30 and 40 and conducted by the vaned shafts 17 and 18 onto said conveyors and passes up thereover to a suitable receptacle at the rear end of the machine and which is not herein shown.

Housings 55 and 56 are arranged below the vaned shafts 17 and 18, and are preferably made in the form of semi-cylindrical members, the rear ends of which are secured by suitable brackets to the cross bar 15 while the front ends thereof are bolted or otherwise secured to the rear ends of the fingers 30 and 40 as is shown clearly in Fig. 3. These semi-cylindrical housings 55 and 56 diverge toward their front ends and their inner edges form a continuation of the outwardly diverging front edges 31 and 41 of the fingers, which finger edges operate to direct the cotton stalks into the space between the troughs or housings and which operate to strip the bolls of cotton off the stalks.

Hoods 57 and 58 extend over the conveyors 52 and 53 and over a portion of the vaned shafts 17 and 18, said hoods being secured along their outer edges to the side bars 12 of the frame. Along the inside edges of the finger plates 30 and 40 are also arranged hood like shields 59 and 60 which, at their rear ends overlap and are secured by soldering or otherwise to the hoods 57 and 58.

An inverted U-shaped frame 61 spans the frame 10 at the rear ends of the hoods 57 and 58 and is secured at its ends to the side members of the frame and is also secured to the rear ends of the hoods. This U-shaped cross member 61 is constructed of heavy metal sufficient to withstand severe strain and supports a driver's seat 62 such as is commonly used on agricultural implements, it being shown mounted on a curved bar 63 and equipped with a spring 64 to increase the comfort of the rider.

Hingedly mounted on the cross member 61 is a tongue 65 which extends forwardly through an upstanding loop-like guide 66 carried by an inverted U-shaped yoke 67 which is pivotally connected at its ends to the side members of the frame 10 as is shown at 68.

A cross bar or plate 69 connects the curved portions of the yoke 67 beneath the upstanding loop 66 thereof as is shown clearly in Fig. 8. This bar 69 reinforces and strengthens the loop 66 and prevents the members of the yoke from spreading.

A plurality of ratchet teeth 70 are formed in the front edge of one side member of the loop 66 as is shown clearly in Fig. 8 and also in Fig. 3 and these teeth are designed to be engaged by ratchets 71 pivoted at one end to the tongue 65 as is shown at 72 in Fig. 3, and to which is connected an operating bar 73 which passes through a suitable guide 74 on the tongue 65 and is equipped at its rear end with a hand member 75 located convenient to the seat of the driver, as is shown clearly in Fig. 3. A coiled spring 76 is attached at one end to the tongue 65 and at its other to the ratchet 71 and exerts its tension to normally hold said ratchet engaged with the teeth 70 of the yoke 67.

It will thus be seen that this ratchet is normally held engaged with the loop member 66 of the yoke 67 whereby the finger carrying frame 10 is adjustably mounted relative to tongue 65 so that it may be positioned at the desired height for gathering cotton from stalks shown at S according to the height of the stalks. To release the ratchet 71, the sliding bar 73 is moved forwardly by push exerted on the hand member 75 and when so disengaged, the gathering mechanism may be adjusted at the desired height by means of a hand wheel 77 carried by one end of a rod 78 which has at its front end a cog wheel 79 which meshes with rack teeth 80 formed in the front edge of the side member of the loop 66 opposite to that which carries the ratchet teeth 70. A combined support and guide bracket 81 rises from the tongue 65 and has a bearing 82 through which the rod 78 loosely extends. A collar 83 is attached to the rod 78 and abuts the bearing 82 to limit the forward movement of the rod 78 to insure the proper engagement of the teeth of the cog wheel 79 with the rack 80. It will thus be seen that when the ratchet 71 is disengaged from the teeth 70 of the yoke member 66, that the gathering mechanism may be raised or lowered by rotating the cog wheel 79 through the rod 78 and hand wheel 77.

A hood 84 is arranged over the sprocket mechanism above described, and, as shown, is made semi-cylindrical in form whereby the mechanism below it is protected from the weather, and also protects clothing and other objects from becoming entangled therewith.

The steel finger plates 30 and 40 form runners or slides which with their fenders 59 and 60 are designed to pass under and raise all the limbs of a cotton plant containing open or boll cotton to a position suitable for harvesting. The cotton bolls so arranged come in contact with the housing members 55 and 56 with the bladed or vaned shafts 17 and 18, said housings being held in adjusted position by means of bolts 85 passed through slots 30' and 40' formed in the finger plates 30 and 40.

This connection of the housings 55 and 56 with the finger plates provides for the adjustment of these housings toward and away from each other to suit any size cotton plants in connection with which the machine is to be used.

It will be obvious that the bladed or vaned shafts 17 and 18 will rotate in opposite directions and are intended to run at a high speed so that a strong current of air is directed upwardly thereby between the housings 55 and 56 which air lifts the loose cotton to a position suitable to come in contact with the vanes of the shafts 17 and 18. It will thus be seen that all open and unopen bolls of cotton are stripped by fingers 30 and 40, the housing members 55 and 56 and the blades of shafts 17 and 18 from the stalks and deposited on the conveyors 52 and 53 over which the cotton travels to a suitable place of deposit.

The housing members 55 and 56 in connection with the bladed shafts 17 and 18 operate in a manner similar to the human hand in gathering the cotton bolls from the stalks and the rapid rotation of the shafts 17 and 18 produces strong currents of air which direct the loose cotton onto the conveyors.

While the preferred embodiment of the invention has been herein shown and particularly described, it is not desired to limit the invention to the precise details of construction shown, as changes may readily be made without departing from the spirit of the invention.

I claim:—

1. In a harvesting machine, a wheeled supporting structure, plant product gathering means carried by said structure, and means for adjustably supporting said gathering means according to the elevation of the rows of plants to be operated upon, said adjusting means comprising an inverted U-shaped yoke mounted at its ends on said supporting structure, a tongue mounted on said structure, and cooperating means carried by said tongue and yoke adjustable to raise and lower said gathering means.

2. In a harvesting machine, a wheeled supporting structure, plant product gathering means carried by said structure, and means for adjustably supporting said gathering means comprising an inverted U-shaped yoke pivoted at its ends to said structure and extending upwardly therefrom, a tongue mounted on said structure and extending through said yoke, a ratchet pivoted on said tongue, teeth formed on said yoke with which said ratchet is designed to engage, and means positioned adjacent the driver for releasing said ratchet from said teeth.

3. In a harvesting machine, a wheeled supporting structure, plant product gathering means carried by said structure, and means for adjustably supporting said gathering means comprising an inverted U-shaped yoke pivoted at its ends to said structure and extending upwardly therefrom, a tongue mounted on said structure and extending through said yoke, a ratchet pivoted on said tongue, teeth formed on said yoke with which said ratchet is designed to engage, and means positioned adjacent the driver for releasing said ratchet from said teeth, rack teeth carried by said yoke, a cog wheel meshing with said teeth and means connected with said cog wheel and positioned adjacent the driver's seat whereby the wheel may be turned to raise and lower the gathering mechanism.

4. In a harvesting machine, a wheeled supporting structure, plant product gathering means carried by said structure, a tongue pivotally mounted on said structure and extending forwardly from said gathering means, an inverted U-shaped yoke pivotally connected at its ends to said structure and through which said tongue extends, cooperating means on said tongue and yoke for locking them in relative adjusted position, means for releasing said locking means, and cooperating means carried by the tongue and yoke for raising and lowering the gathering means.

BEDFORD HESTAND.